United States Patent [19]

Gohde et al.

[11] 3,821,644
[45] June 28, 1974

[54] DEVICE FOR AUTOMATIC COUNTING AND MEASUREMENT OF SUSPENDED PARTICLES

[76] Inventors: Hildegard Gohde, both of Post Box 3244, Munster; Wolfgang Godhe, both of Munster, Germany

[22] Filed: Mar. 19, 1973

[21] Appl. No.: 342,494

[30] Foreign Application Priority Data
Apr. 26, 1971 Germany.............................. 2120342

[52] U.S. Cl. .......................................... 324/71 CP
[51] Int. Cl. ........................................ G01m 27/00
[58] Field of Search............ 324/71 R, 71 CR, 61 R, 324/65 R

[56] References Cited
UNITED STATES PATENTS
3,039,051  6/1962  Locher............................ 324/71 CP
3,231,815  1/1966  Spencer........................... 324/71 CP Primary Examiner—Alfred E. Smith
Attorney, Agent, or Firm—Roylance, Abrams, Berdo & Kaul

[57] ABSTRACT

A particle detecting apparatus includes a gap defined between two electrodes at least one of which constitutes three plates of electrically conductive material separated from each other by electrically nonconductive material, the two electrodes being supported in an electrically nonconductive mounting. The opening thus formed is of capillary dimensions. The electrodes are connected to circuit means which impose a potential between the electrodes, subjecting the intervening space to an electric field. The dielectric characteristics in the gap are altered as a dispersion of particles is passed therethrough, the dielectric changes being detected by the circuits connected to the electrodes. In one embodiment, capacitors connect the outer two electrodes to ground and the center electrode to a measuring device. In another embodiment, each side has three electrodes and the center electrodes constitute the frequency determining elements of an oscillator. In each case the three plates forming the electrode have substantially flat, parallel faces perpendicular to the direction of flow of the particle suspension.

6 Claims, 4 Drawing Figures

DEVICE FOR AUTOMATIC COUNTING AND MEASUREMENT OF SUSPENDED PARTICLES

This invention relates to a device for the automatic counting and measurement of suspended particles, particularly small microscopic particles in the nature of blood corpuscles, cells and bacteria.

In devices of this general kind, it is common practice to suspend particles in a suspension medium and force or suck the suspension through pores or capillaries which serve as the measuring environment. Because the measuring point, pore or capillary, serves as a conducting connection between two electrodes with direct current voltage potential in two vessels filled with an electrolytic solution, each particle in its passage through the pore or capillary triggers an electric pulse by causing a change in the resistance in the pore or capillary, the pulse being detected and counted to indicate the existence and size of the particle. In this way it is possible to determine particle densities in suspensions and particle counts in specific suspension volumes by electrical means with good rapidity and accuracy. Under specific conditions, the magnitude of the change of resistance caused by each particle in passing through the pore or capillary is in proportion to its size. This can thus be used for electrical size determination of microscopic particles.

It is known to provide two vessels filled with an electrolytic solution and conductively interconnect the two by a fine capillary or pore. In both vessels there are two electrodes on which a DC potential is applied. By pressure or vacuum, flow of the particle suspension from one vessel to the other is induced through the capillary or pore. Each particle passing therethrough causes a change in resistance, inducing pulses which can be amplified, counted and classified.

The sensitive volume for the detection of the particles in the region of the capillary or pore in such devices, corresponding to the anterior curvature of the equipotential surfaces, protrudes very far in the direction of the two electrodes so that it is necessary to work with very dilute particle suspensions in order to avoid counting and measurement error as particles pile up in the sensitive volume. In connection with the very extensive anterior curvature of the sensitive volume, the particles, on their path through the capillary or pore, pass through zones with very different electric field strengths. This means that a particle that passes near the edge, in going through the capillary or pore, triggers a higher level signal than a particle of equal size that moves through the middle of the pore or capillary. This causes erroneous size measurements. It is known in one device to minimize this source of error by limiting the flow of the dispersion to the central portion of the capillary by surrounding it with a second fluid, thereby forcing particles to go through a specific space.

Also, in known arrangements for counting and measuring particles by electrical means, the sensitive volume for the detection of particles is of necessity quite large because of the anterior curvature of the equipotential surfaces upstream and downstream of the pore or capillary in the direction of the two electrodes. This effect can only be slightly reduced by shortening the capillary as a conductive connection between the two vessels. This further tends to induce a relatively high incidence of pileup in the counting and measuring process.

In the prior art known devices, it has been necessary for accurate measurement to provide the previously mentioned central flow arrangement wherein the work is done with two different fluids flowing through the capillary or pore. The particle suspension flows through a thin tube that is directed to the middle of the capillary, the suspension being sheathed by a particle-free liquid of the same conductivity as the dispersant. This arrangement has the advantage that all particles move through the middle of the capillary, but it has the drawback that there must be two different fluids, requiring considerable effort and technical difficulty in regulating the two fluid flows and increasing the likelihood of equipment breaking down. Additionally, the suspension tube must be precisely adjusted with respect to the capillary. Finally, even in this device, the sensitive volume is necessarily rather large.

It has also been necessary to make the vessels and interconnecting capillaries relatively large, permitting disturbances during the counting and measuring processes from external electromagnetic sources.

Yet another disadvantage of known devices resides in the fact that the vessels, which are interconnected by the capillary and which contain the electrolyte solution, must be used as direct current or voltage resistors, entailing the use of an electrolyte solution the conductivity of which is precisely adjusted.

One object of the present invention is to provide a device in which the sensitive zone for electrical detection for the measurement and counting of particles is particularly small to prevent a high pileup fraction.

Another object of the invention is to provide a device in which the magnitude of the electrical signal caused by the passage of each particle is independent of the location within the passage of the particle as it passes through the capillary or pore in that it is immaterial whether a specific particle passes the measuring zone near the edge or in the middle of the pore.

Another object is to provide a particle measuring and counting apparatus in which the task is accomplished using a flow arrangement with only one fluid.

A still further object is to produce a counting and measuring apparatus which operates independent of external disturbances from electric fields for reliable counting of small particles such as bacteria.

Broadly described, the invention includes means for defining a passage of capillary dimensions with an electric field therein, the means including three electrically conductive plates in parallel nearly contiguous relationship, the plates being separated only by a relatively thin layer of electrically nonconductive material; and a fourth plate opposite the first three, defining opposite sides of the gap. The remaining sides are defined by electrically nonconductive material. Circuit means connected to the plates provides an electric field across the path. In one embodiment, a DC field is produced by connecting a direct voltage source, through diodes, to the plates and the plates are connected by capacitors to a measuring device, in the case of the center plate, and to ground or the return side of the DC source, in the case of the outer plates. Operational amplifiers can be used in place of the diodes. The middle one of the three plates is made relatively short in the direction of flow of the suspension carrying the particles to make the sensitive volume small. Only the center plate is used to develop a signal, decreasing errors due to pileup. The electric field formed is homogeneous so that particles of equal size create substantially the same kind of output signal regardless of the location within the capillary tube through which the particle passes.

In a further embodiment, the plates of conductive material are connected in an alternating current oscillator circuit to form a frequency determining portion thereof, the passage of particles through the capillary effecting a change in the oscillator frequency. In that sense, the device is similar to an alternating current resistor.

In order that the manner in which the foregoing and other objects are attained in accordance with the invention can be understood in detail, particularly advantageous embodiments thereof will be described with reference to the accompanying drawings, which form a part of this specification, and wherein.

Figure 1:
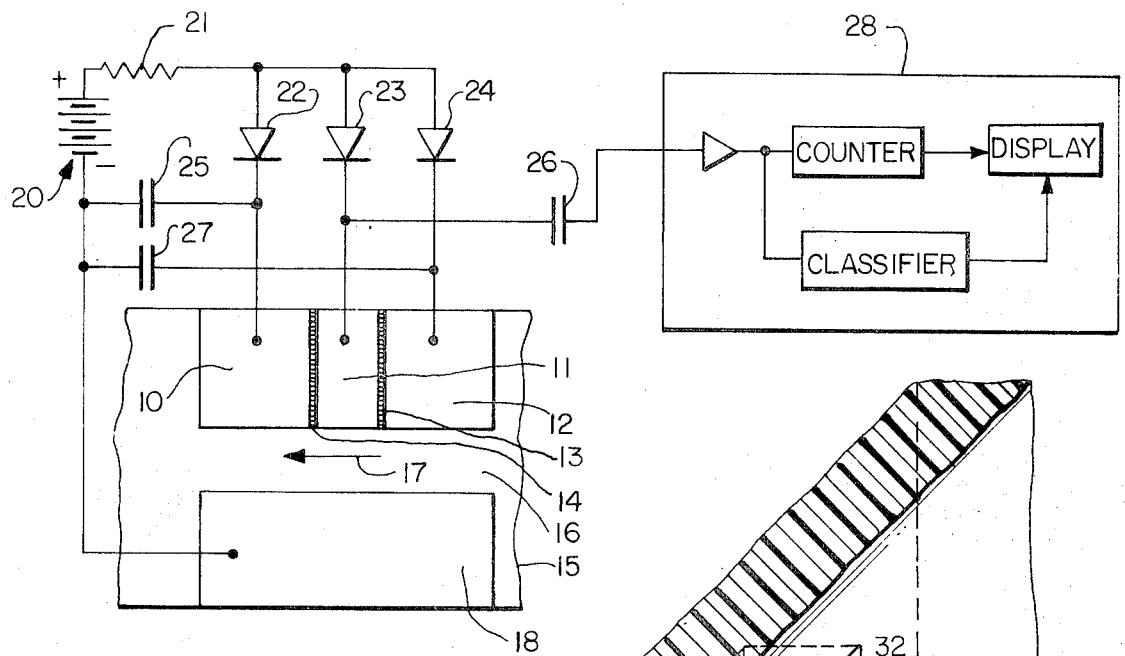
FIG. 1 is a schematic diagram of one embodiment of the invention including circuit means.

As shown in FIG. 1, the apparatus includes three parallel electrically conductive plates 10, 11 and 12, plate 11 being sandwiched between plates 10 and 12 and separated and electrically insulated therefrom by relatively thin electrically nonconductive layers 13 and 14. The plates are mounted on and extend from a surface 15 which is also electrically nonconductive and which forms a wall defining a capillary passage 16 through which a suspension of particles can flow as indicated by the arrow 17.

Plates 10, 11 and 12 terminate in a common surface defining one wall of the capillary passage. Opposite that surface is a plate 18 which is electrically conductive and which is also mounted on surface 15. A fourth wall, not shown in FIG. 1, is also provided to complete the confinement of the particle suspension in passage 16.

As shown in FIG. 1, the components thus far described are connected to circuit means including a DC voltage source, indicated as a battery 20, the positive terminal of which is connected through a load resistor 21 to the anodes of conventional semiconductor diodes 22, 23 and 24. The cathodes of diodes 22–24 are connected electrically to plates 10, 11 and 12, respectively, and also to capacitors 25, 26 and 27, respectively. The other terminals of capacitors 25 and 27 are connected to the negative terminal of battery 20. The other side of capacitor 26 is connected to a pulse detecting and counting unit 28. The negative terminal of battery 20 is also connected to plate 18.

As will be recognized from this schematic diagram, connection of battery 20 in the manner shown through diodes 22–24 produces a unidirectional electric field across the gap defined by plates 10–12 on one side and plate 18 on the other side. Passage of particles 17 between the faces of these plates produces an alteration in the electric field, which alteration is manifested at the cathodes of the diodes as an electrical pulse. The pulses developed in plates 10 and 12, however, are shunted to ground, or to the negative side of the supply, by capacitors 25 and 27. Only the pulse which appears at the cathode of diode 23 is utilized, this pulse being coupled through capacitor 26 to detecting and counting device 28 which is capable of sensing, classifying and counting the pulses to provide the desired size and number measurement information.

It will be seen that between plate 18 and the opposite plates, with suitably thin insulation, there is formed an electric field which presents entirely parallel lines of force on the surface of plate 11. The changes in resistance which the particles trigger as they pass through channel 16 in the regions of plates 10 and 12 are signals of an unreliable nature because of the inhomogeneity of the fields adjacent those plates due to fringe effects and the like which are well known at the edges of plates forming electric fields. Only in the region of plate 11 is there a signal truly in proportion to the size of the particle resulting from the passage of the particle through the homogeneous electric field, which signal is coupled through capacitor 26 to the measuring apparatus.

Figure 2:
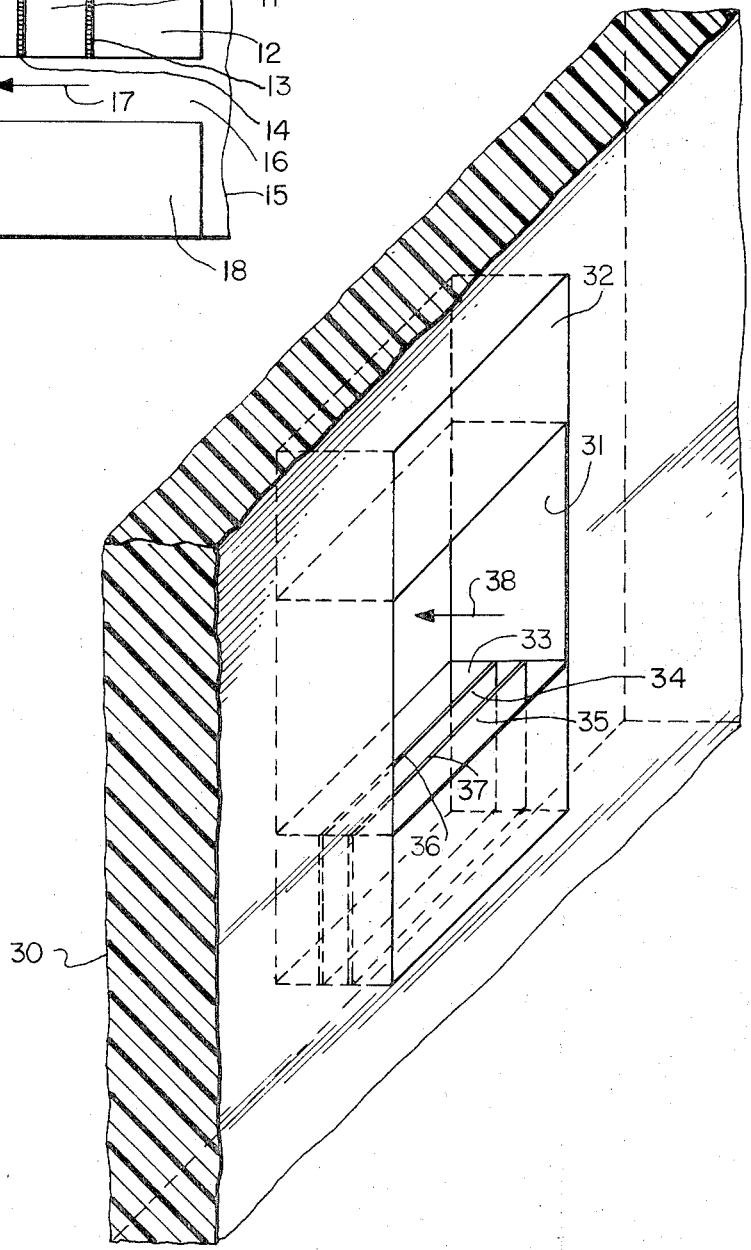
FIG. 2 is a perspective drawing of one structure according to the invention.

It will be recognized that one convenient use for the apparatus disclosed herein is to measure and count particles in a dispersion as the dispersion is caused to pass between two chambers. Thus, the apparatus can conveniently be mounted in a partition between two such chambers, and an apparatus for this purpose is illustrated in FIG. 2. The partition 30, which is made of an electrically nonconductive material, is provided with a rectangular opening 31 which contains, at one end thereof, an electrode or plate 32 which is made of an electrically conductive material. At the other extreme of the rectangular opening is an assembly of three electrically conductive plates 33, 34 and 35, which plates are in parallel spaced relationship and separated and insulated from each other by relatively thin layers of electrically nonconductive material 36 and 37. The analogy between this structure and the arrangement described with reference to FIG. 1 will be readily apparent, plate 32 being equivalent to plate 18 and plates 33–35 being equivalent to plates 10–12.

The apparatus shown in FIG. 2 can be connected to a circuit similar to that shown in FIG. 1, these connections being omitted from FIG. 2 for simplicity. Flow can then be directed as indicated by arrow 38 through the opening between the electrode structures, permitting classification and measurement of particles in the flowing suspension.

As will be seen, the thickness of plate 34 is significantly smaller than the outer plate, limiting the sensitive volume to a relatively small number. This volume is determined solely by the cross-sectional area of the opening between the plate structures and the dimension of the central plate in the direction of flow of the particle suspension.

Figure 3:
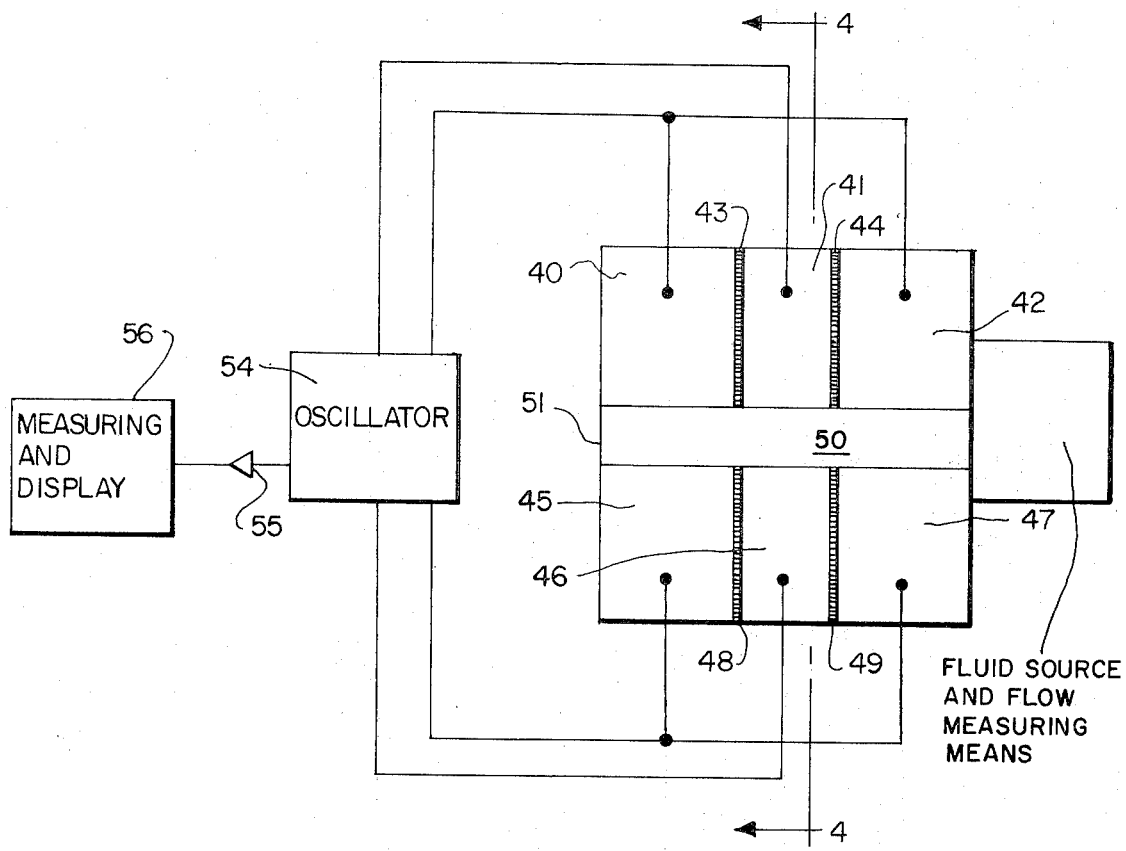
FIG. 3 is a schematic diagram of a further embodiment of the invention.

A further embodiment of the invention is shown in FIG. 3 in which one electrode structure includes three plates 40, 41 and 42, these plates being mounted as previously described with thin insulating portions 43 and 44 separating the plates. However, in this embodiment the opposite electrode similarly includes three plates 45, 46 and 47, these being separated by insulating layers 48 and 49. The opposed parallel bases of the electrode structures thus formed define a passage 50, the conductive electrodes being mounted on an insulating wall 51 and a parallel opposed insulating wall 52, not shown in FIG. 3.

The structure shown in FIG. 3 constitutes an alternating current resistor and is electrically connected to an oscillatory circuit 54 as the frequency determining portion thereof. The change in frequency which occurs in the electrode structure is proportional to the particle size of particles in a suspension passing through capillary passage 50. The output of oscillator 54 is then connected to an amplifier circuit 55 and the result thereof can be connected to suitable counting and classifying circuits capable of discriminating the frequency modulation induced by the passage of particles through the capillary channel.

By means of known devices, for example, a piston pump or a mercury manometer device, a specific volume of particle suspension can be forced or sucked through the capillary tube so that the correlation of recorded particle count and suspension volume can be easily made.

Figure 4:
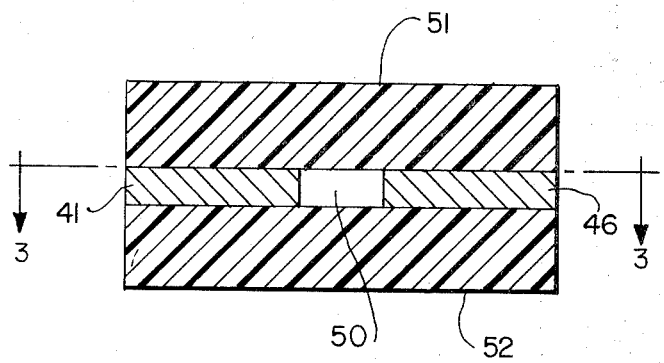
FIG. 4 is a sectional view of a further embodiment of a structure according to the invention.

FIG. 4 illustrates a section along lines 4—4 of FIG. 3, disclosing the insulating walls 51 and 52 which enclose and support the electrode structures defining passage 50.

As will be seen, the arrangement of the invention offers the advantage that the particles to be counted and measured pass through a completely homogeneous electric field in the zone of the middle plate of the three plates disposed on at least one side of the capillary. Consequently, it is of no importance, so far as the measurement is concerned, whether a particle moves through the capillary or in the vicinity of the wall more toward the middle of the channel. More exact measurements of size are also possible. It is no longer necessary to employ an elaborate and complicated central flow arrangement requiring repeated adjustment, and sheathing flow is similarly unnecessary. Because the lines of force in the electric field are parallel in the device of the invention through the measuring zone, as opposed to the bulging equipotential surfaces in conventional devices, the size of the sensitive volume needed for particle detection is determined solely by the cross-sectional area of the capillary and the dimension of the middle one of the three plates in the flow direction. By reducing that dimension the sensitive volume can be almost arbitrarily diminished. A limit is set only by the size of the particles to be counted and measured.

The device of the invention also can be built with unusual compactness, permitting it to be particularly resistant to the disturbances of external fields.

It is also an advantage in using the embodiment of FIGS. 3 and 4 in an oscillatory circuit that the passage of particles causes a pronounced change in frequency in a relatively compact device, rendering the apparatus quite independent of external fields of disturbance. It will be noted that substantially any liquid or gas can be used as a dispersant, the dispersant then acting as a dielectric between the opposed electrodes. The counting and measuring operation is therefore independent and there is no need to be concerned with an electrolyte which would require conductivity adjustment.

While certain advantageous embodiments have been chosen to illustrate the invention, it will be understood by those skilled in the art that various changes and modifications can be made therein without departing from the scope of the invention as defined in the appended claims.

What is claimed is:

1. A device for counting and measuring suspended particles in a flowing fluid suspension comprising a first electrode including first, second and third plates of electrically conductive material mounted in substantially adjacent relationship, said first electrode having an exposed face including parts of the three plates;

insulating means for electrically isolating said plates from each other;

a second electrode having an exposed face spaced from said exposed face of said first electrode;

electrically nonconductive means forming walls extending between said faces to define a capillary flow passage through which a fluid particle suspension can be passed;

means for generating a unidirectional electric field between said faces, said means comprising
a voltage source; and
means for connecting one side of said voltage source to said first electrode and the other side of said source to said second electrode;

measuring circuit means for accepting input signals from said first electrode and producing an output signal representative of characteristics of the particles in the suspension; and capacitive circuit means for connecting said second plate to said measuring circuit means.

2. A device according to claim 1 wherein the dimension of said second plate is significantly shorter than said first and third plates in the direction of suspension flow.

3. A device according to claim 2 and further comprising first and second chambers for containing the suspension, said passage constituting a flow connection between said first and second chambers.

4. A device for counting and measuring suspended particles in a flowing suspension comprising a first electrode including first, second and third plates of electrically conductive material mounted in substantially adjacent relationship, said first electrode having an exposed face including parts of the three plates, the dimension of said second plate being significantly shorter than said first and third plates in the direction of suspension flow;

insulating means for electrically isolating said plates from each other;

a second electrode having an exposed face spaced from said exposed face of said first electrode;

electrically nonconductive means extending between said faces to define a capillary flow passage through which a particle suspension can be passed;

first and second chambers for containing the suspension, said passage constituting a flow connection between said chambers;

means for generating an electric field between said faces, said means comprising
a voltage source; and
means for connecting one side of said voltage source to said first electrode and the other side of said source to said second electrode;

measuring circuit means for accepting input signals from said first electrode and producing an output signal representative of characteristics of the particles in the suspension;

capacitive circuit means for connecting said second plate to said measuring circuit means; and means for determining the volume of suspension being delivered through said passage.

5. A device for counting and measuring suspended particles comprising
- a first electrode including, first, second and third plates of electrically conductive material mounted in substantially adjacent relationship, said first electrode having an exposed face including parts of the three plates;
- insulating means for electrically isolating said plates from each other;
- a second electrode having an exposed face spaced from said exposed face of said first electrode;
- electrically nonconductive means extending between said faces to define a capillary flow passage through which a particle suspension can be passed;
- means for generating an electric field between said faces, said means comprising
  - a voltage source including a direct voltage source and a load resistor; and
  - means for connecting one side of said voltage source to said first electrode and the other side of said source to said electrode, said means for connecting including first, second and third diodes for connecting said source to the plates of said first electrode;
- measuring circuit means for accepting input signals from said first electrode and producing an output signal representative of characteristics of the particles in the suspension; and
- capacitive circuit means for connecting said second plate to said measuring circuit means.

6. A device for counting and measuring suspended particles comprising
- a first electrode including first, second and third plates of electrically conductive material mounted in substantially adjacent relationship, said first electrode having an exposed face including parts of the three plates;
- insulating means for electrically isolating said plates from each other;
- a second electrode having an exposed face spaced from said exposed face of said first electrode, said second electrode comprising fourth, fifth and sixth mutually insulated plates;
- electrically nonconductive means extending between said faces to define a capillary flow passage through which a particle suspension can be passed;
- means for generating an electric field between said faces, said means comprising
  - a voltage source including an oscillator; and
  - means for connecting one side of said oscillator to said fifth plate of said second electrode, said second and fifth plates thereby constituting a frequency determining element thereof;
- measuring circuit means for accepting input signals from said first electrode and producing an output signal representative of characteristics of the particles in the suspension; and
- capacitive circuit means for connecting said second plate to said measuring circuit means.

* * * * *